J. P. McCOY.
CHAPLET.
APPLICATION FILED NOV. 20, 1909.

967,034.

Patented Aug. 9, 1910.

Witnesses-

Inventor-
John P. McCoy.
by his Attorneys-
Howson & Howson

UNITED STATES PATENT OFFICE.

JOHN P. McCOY, OF PHILADELPHIA, PENNSYLVANIA.

CHAPLET.

967,034.  Specification of Letters Patent.  Patented Aug. 9, 1910.

Application filed November 20, 1909.  Serial No. 529,111.

*To all whom it may concern:*

Be it known that I, JOHN P. McCOY, a citizen of the United States, residing in Philadelphia, Pennsylvania, have invented certain Improvements in Chaplets, of which the following is a specification.

One object of my invention is to provide a chaplet of the general type shown in Patent No. 713,571, to J. P. McCoy and W. V. Lukens, dated November 11, 1902, which shall be of such a construction that it shall be a practical impossibility for its end flanges to be forced toward each other even under the most severe conditions of use.

I also desire to provide a novel method of making the chaplet.

In the manufacture of chaplets it sometimes happens that the end flanges are improperly fixed on their spindles owing to the accidental use of spindles slightly under the requisite length, and also on account of an occasional abnormal softness of the metal used, either for flanges or spindle. Under such conditions, the flanges of the chaplets are not properly mounted on the spindle and may even move thereon, so as to fail to suitably support the walls of the mold in which such chaplet is used during the process of casting. With the chaplet constructed according to my present invention the danger of such failure is obviated.

These objects and other advantageous ends I secure as hereinafter set forth, reference being had to the accompanying drawings, in which;—

Figure 1:
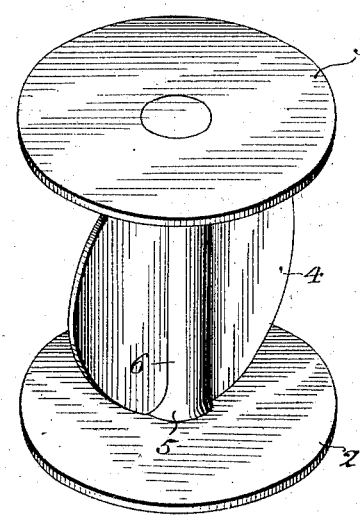
Figure 2:
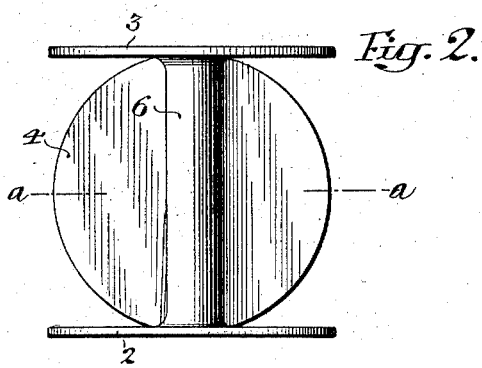
Figure 3:
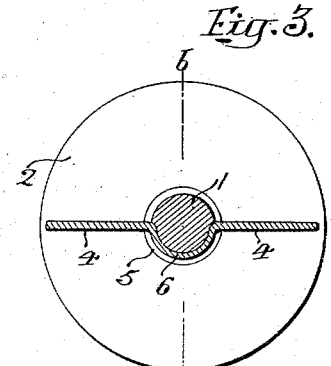

Figure 1, is a perspective view of a chaplet constructed according to my invention; Fig. 2, is a side elevation; Fig. 3, is a horizontal section on the line $a$—$a$, Fig. 2, and Fig. 4, is a vertical section on the line $b$—$b$, Fig. 3.

In the above drawings, 1 represents a spindle and 2 and 3 are the flanges mounted on the opposite sides of said spindle.

Between the flanges or heads of the chaplet and for the greater part lying in a radial plane of the spindle, is a thin plate 4, forming in effect two ribs extending radially on opposite sides of said spindle and abutting directly upon the two flanges or heads 2 and 3.

Figure 4:
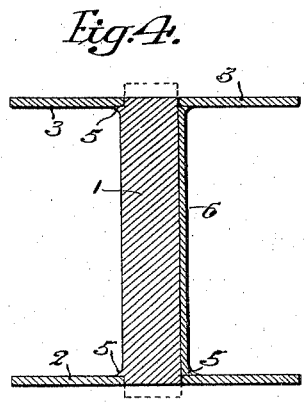

In the manufacture of the chaplet, the heads or flanges 2 and 3 are mounted upon the ends of the spindle which extend through them as indicated in dotted lines, in Figs. 3 and 4, while the plate which is designed to form the intermediate web 4, in the present instance a circular washer, of the proper diameter, is placed upon the spindle so as to fit between said two heads. By suitable machinery, the ends of the spindle are then forced longitudinally toward each other or upset so that the metal of said ends is actually caused to flow to such an extent that it enters and fills suitable cavities in the dies, partially forming the collars or abutments 5 just inside of the two flanges 2 and 3. At the same time, the spindle and with it the web plate 4, is subjected to heavy transverse pressure by dies shaped to cause the metal of the spindle to also flow laterally, so that its section, instead of being circular as originally assumes the form indicated in Fig. 3. That is to say, while the spindle portion of the finished chaplet is actually circular in section, it consists of two parts, of which one is formed by the spindle originally provided, and the other is formed by the part 6 of the plate 4 which has been bent and caused to flow or becomes crushed into said spindle. Moreover, those portions of the plate 4 adjacent to the end heads or flanges 2 and 3 are caused to flow so that they also form a part of the collars 5.

The pressure to which the metal is subjected is so great and the cohesion of the spindle and the plate 4 so perfect that said plate cannot be displaced by the roughest handling or even by the exertion of a relatively great force, but is to all intents and purposes practically integral with the stem and flanges of the chaplet. It is to be understood that the operation of making the chaplet is performed cold, that is to say, neither the material nor the dies are heated.

It is obvious that the plates or washers forming the reinforcing rib or web may be of forms other than circular, as may also the end flanges or heads.

I claim;—

1. A chaplet consisting of a spindle having heads, and a laterally projecting web structurally independent of the heads and spindle, and extending between said heads.

2. A chaplet consisting of a spindle having heads, with a plurality of oppositely placed webs extending laterally from said spindle between said heads.

3. A chaplet consisting of a spindle having heads, and a plate extending radially from the spindle on opposite sides thereof between the heads thereof.

4. A chaplet consisting of a spindle, two heads, and a web extending between said heads, the parts being held together by cohesion.

5. The combination of a chaplet having a spindle and heads, with a plate extending between said heads, said plate extending substantially radially from the spindle and being curved around the same.

6. A chaplet consisting of a spindle upset at its ends to form collars, heads fixed to the spindle and abutting upon said collars, with a reinforcing web projecting from the spindle between said heads.

7. A chaplet consisting of a spindle upset at its ends to form collars, heads fixed to the spindle and abutting upon said collars, with a reinforcing web projecting from the spindle between said heads and constituting a portion of said spindle.

8. The combination in a chaplet of a spindle having laterally extending portions forming an abutment adjacent to each end, heads mounted on the ends of said spindle and engaging said abutments, with a plate forming webs curved around the spindle between the heads, said plate being formed to constitute a part of the abutments at the ends of the spindle.

In testimony whereof, I have signed my name to this specification, in the presence of two subscribing witnesses.

JOHN P. McCOY.

Witnesses:
WILLIAM E. BRADLEY,
WM. A. BARR.